United States Patent [19]

Wollar et al.

[11] Patent Number: 4,556,351
[45] Date of Patent: Dec. 3, 1985

[54] EXPANSION RIVET ASSEMBLY

[75] Inventors: Burnell J. Wollar, Barrington, Ill.; Richard J. Schwind, Akron, Ohio

[73] Assignee: Phillips Plastics Corporation, Phillips, Wis.

[21] Appl. No.: 672,152

[22] Filed: Nov. 16, 1984

Related U.S. Application Data

[63] Continuation of Ser. No. 371,652, Apr. 26, 1982, abandoned.

[51] Int. Cl.⁴ .............................................. F16B 13/06
[52] U.S. Cl. ........................................ 411/38; 411/43; 411/57; 411/908
[58] Field of Search ..................... 411/34–38, 411/40, 41, 43, 70, 57, 908

[56]  References Cited
U.S. PATENT DOCUMENTS

| | | | |
|---|---|---|---|
| 2,061,629 | 11/1936 | Huck | 411/70 |
| 3,074,134 | 1/1963 | Buechler | 411/45 |
| 3,230,818 | 1/1966 | Siebol | 411/34 |
| 3,377,907 | 4/1968 | Hurd | 411/70 |
| 4,002,099 | 1/1977 | Bradley et al. | 411/70 |
| 4,222,304 | 9/1980 | Yoshida et al. | 411/34 |
| 4,306,824 | 12/1981 | Tanaka et al. | 411/70 |
| 4,318,650 | 3/1982 | Llauge | 411/38 |
| 4,355,934 | 10/1982 | Denham et al. | 411/38 |
| 4,402,638 | 9/1983 | Tanaka | 411/34 |

Primary Examiner—Kenneth J. Dorner
Assistant Examiner—Neill Wilson
Attorney, Agent, or Firm—James E. Nilles; Thomas F. Kirby

[57]  ABSTRACT

An expansion rivet assembly comprises an expandable hollow plastic rivet and a plastic drive pin therefor. The rivet has a head and a shank which is insertable in aligned holes in workpieces to be joined. The drive pin has a head and a shank which is inserted in the rivet bore and adapted to be axially drawn into the rivet bore by a tool which causes the pin head to engage the insertion end of the rivet shank and effect outward expansion of the rivet shank wall and which also causes break-off of the superfluous projecting end of the pin shank at a break-away indentation formed in the pin shank. The pin shank has a groove near its head end which engages a reduced diameter bore portion in the rivet to temporarily hold the pin and rivet together prior to use. The pin shank also has serrations which engage another reduced bore portion in the rivet upon full pin insertion to hold the pin and rivet together permanently. The said other reduced bore portion is serrated to enhance engagement with the serrations.

2 Claims, 14 Drawing Figures

EXPANSION RIVET ASSEMBLY

This application is a continuation, of application Ser. No. 371,652, filed Apr. 26, 1982 now abandoned.

BACKGROUND OF THE INVENTION

1. Field of Use

This invention relates generally to a fastener assembly commonly known as an "expansion rivet" or a "blind rivet" and comprising a hollow plastic expandable rivet and a plastic pin axially movable in the rivet to cause rivet expansion.

2. Description of the Prior Art

Fasteners of the aforesaid general character are known and in use and U.S. Pat. No. 4,222,304 for "BLIND RIVET" illustrates the state of the art. That patent discloses a blind rivet which is injection molded from plastic material. It comprises a female member molded about a male member. The female member is comprised of a flexible tubular wall and a flange about the upper end thereof, the wall defining a stepped portion in the axial bore thereof at the upper end and a plurality of elongate perforations about the wall. The male member is comprised of a shank in the axial bore and axially movable in relation to the tubular wall, an enlarged head at one end in intimate contact and engagement with the lower end of the female member, and a head portion at the other end and protruding from the upper end of the female member. The head portion is shaped to be gripped by a tool for pulling the shank axially through the bore and the shank has a series of peripheral claws each forming a shoulder facing the lower end so that, upon pulling, the perforated flexible tubular wall collapses and expands radially and successive claws snap their respective shoulders into engagement with the shoulder of the stepped portion, the engagement of the shoulders maintaining the tubular wall of the female member radially expanded and locking the male member against axial movement towards the lower end of the female member.

In the above-described prior art fastener the male and female members are molded together, one about the other, during manufacture in a so-called "two shot" molding process and are not separable, even though separability of the fastener components is sometimes desirable during fastener installation if clearance is a problem. Furthermore, since interengaging serrations are necessarily formed on the prior art male and female members during manufacture, considerable force is required initially to effect axial movement of the pin in the rivet before expansion of the rivet walls occurs. In addition, the prior art pin is so constructed that the portion thereof which protrudes from the rivet after fastener installation must be cut off in a discrete step by means of a cutting tool. In particular, since the prior art rivet and pin are molded together by the "two-shot" molding process, it is not practical to mold a break-away indentation or groove in the pin because this groove would fill with plastic material from formation of the rivet therearound.

SUMMARY OF THE PRESENT INVENTION

In accordance with the present invention there is provided an improved expansion rivet assembly which is constructed so as to overcome the aforementioned problems associated with some prior art "expansion rivets" or "blind rivets" and to provide other advantages.

An expansion rivet assembly in accordance with the invention comprises two separately molded plastic components, namely: an expandable hollow plastic rivet or female member and a plastic drive pin or male member. The rivet has a head or flange at one end and has a slotted shank insertable in aligned holes in workpieces to be joined. The rivet has a bore therethrough and the bore has portions of reduced diameter at opposite ends. The portion of reduced diameter near the head end of the rivet is provided with annular grooves. The drive pin has a head at one end and a shank which is extendable through the rivet bore. The drive pin shank has a first cylindrical portion and an adjoining second cylindrical portion of reduced diameter. A break-away indentation is located between the first and second portions. The first portion includes serrations and also a groove adjacent the pin head. The drive pin is adapted to be axially drawn into the bore in the rivet by a tool which causes the drive pin head to engage the insertion end of the rivet shank and effect outward expansion of the rivet shank wall. Such movement also finally causes break-off of the superfluous projecting end of the pin shank at the aforementioned break-away indentation formed in the pin shank. The reduced bore portion near the insertion end of the rivet engages the groove in the pin shank adjacent the pin head to temporarily hold the pin and rivet together prior to use. The serrations in the first portion of the pin shank, which are initially disengaged from the large diameter bore portion of the rivet, engage the grooved bore portion of reduced diameter at the head end of the rivet upon full insertion to hold the pin and rivet together permanently.

An expansion rivet assembly in accordance with the present invention offers several advantages over the prior art. For example, the groove in the pin shank adjacent the pin head engages the portion of reduced diameter at the insertion end of the rivet to temporarily secure the rivet and pin together prior to use to prevent loss or misplacement of one or the other of the components, yet the rivet and pin are easily separated if such is desired to facilitate fastener installation in cramped quarters or for other reasons. Also, since the pin comprises a smooth shank portion and serrations on the pin shank which do not initially engage any portion of the rivet bore, relatively smaller forces are required to initiate axial pin movement into and through the rivet bore, as compared to the prior art. However, when the serrations on the shank of the drive pin finally engage the annular grooved portion of reduced diameter in the rivet bore when the pin is pulled axially relative to the rivet, the two components become inseparably engaged. Furthermore, since the pin is designed with a break-away indentation in the shank thereof, separation of the excess or protruding pin shank portion is a result of merely continuing to exert axial forces imposed by the installation tool after full rivet expansion is achieved and no separate cutting tool or break-off step is required. A fastener assembly in accordance with the invention is economical to fabricate and use. It remains permanently emplaced once installed and becomes even more firmly emplaced with the passage of time as the interengaging plastic surfaces flow together. Other objects and advantages of the invention will hereinafter appear.

DRAWINGS

DESCRIPTION OF PREFERRED EMBODIMENTS

First Embodiment

Figure 5:
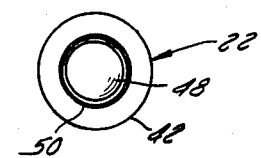
FIG 5 is an end view of the insertion end of the pin of FIG. 4.
Figure 3:
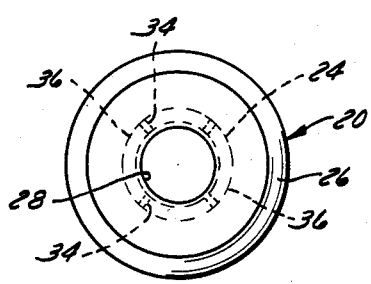
FIG. 3 is a plan view of the head end of the rivet of FIGS. 1 and 2.
Figure 1:
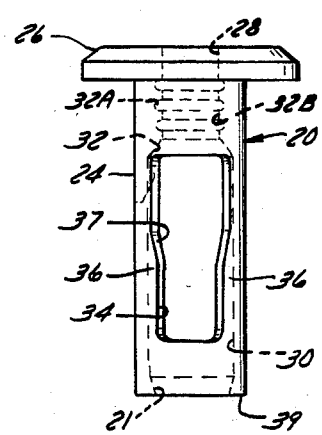
FIG. 1 is a side elevation view of one side of a rivet for an expansion rivet assembly in accordance with a first embodiment of the invention.
Figure 2:
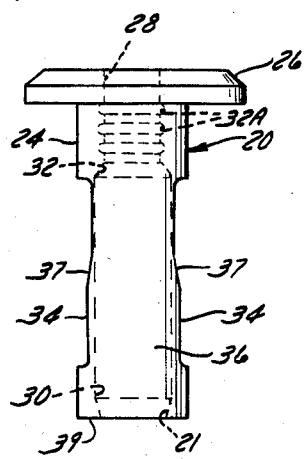
FIG. 2 is a view similar to FIG. 1 but showing another side of the rivet.
Figure 4:
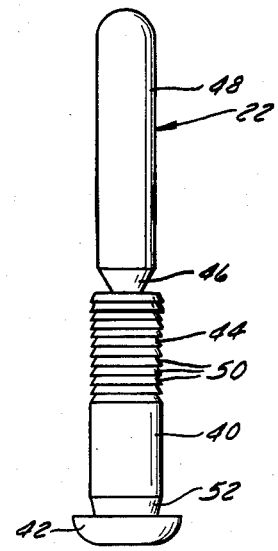
FIG. 4 is a side elevation view of a drive pin for an expansion rivet assembly in accordance with the invention.
Figure 6:
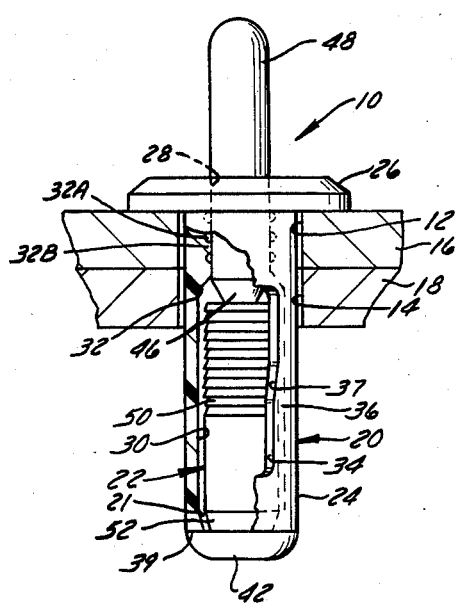
FIG. 6 is a side elevation view, partly in section, of an expansion rivet assembly in accordance with the first embodiment, and showing it associated with workpieces to be joined but prior to expansion of the rivet.
Figure 7:
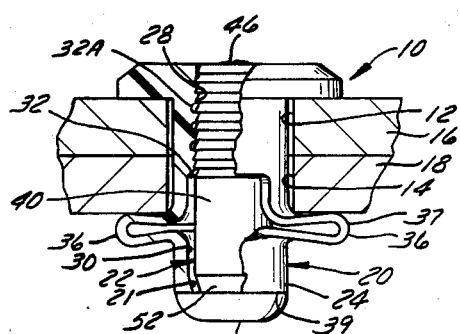
FIG. 7 is a view similar to FIG. 6 but showing the assembly after expansion of the rivet and break-off of the pin.

Referring to FIGS. 1 through 8, the numeral 10 designates an expansion rivet assembly in accordance with a first embodiment of the invention which is insertable through aligned holes 12, 14 in a plurality of (two) workpieces 16, 18, respectively, (see FIGS. 6, 7, 8) to secure the workpieces together firmly and permanently. FIG. 6 shows the expansion rivet assembly 10 disposed in the aligned workpiece holes 12, 14 but not yet expanded, whereas FIG. 7 shows the expansion rivet assembly 10 fully installed. The expansion rivet assembly 10 comprises two components, namely, a female member or expandable hollow plastic rivet 20 and an associated male member or plastic drive pin 22 which is insertable in the rivet and movable therein by a tool (not shown) axially relative to the rivet to effect expansion of the latter, as comparison of FIGS. 6 and 7 shows. Rivet 20 and pin 22 are made of a relative hard plastic such as Nylon (TM) acetal plastic material or the like and are formed separately by injection molding processes.

Figure 8:
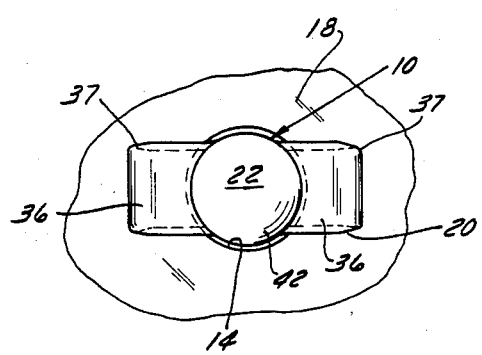
FIG. 8 is a bottom plan view of the assembly of FIG. 7.
Figure 11:
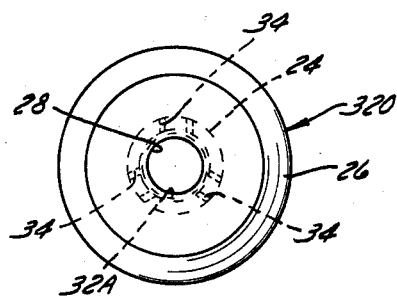
FIG. 11 is a plan view of the head end of the rivet of FIGS. 9 and 10.
Figure 9:
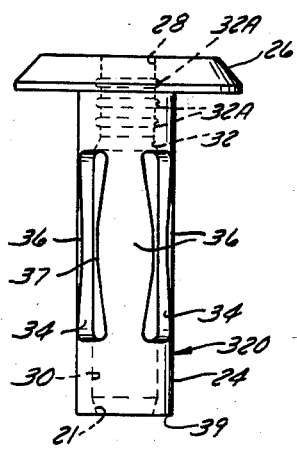
FIG. 9 is a side elevation view of one side of another form of rivet for an expansion rivet assembly in accordance with a second embodiment of the invention.
Figure 10:
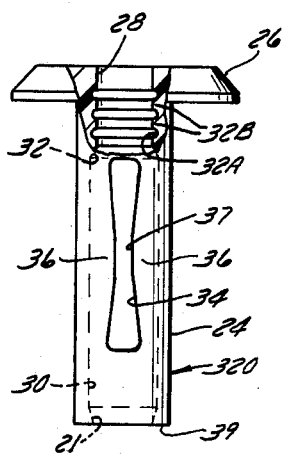
FIG. 10 is a view similar to FIG. 9 but showing another side of the rivet.

Rivet 20, which has a head end and an insertion end, comprises a cylindrical shank 24 and a head or flange 26 at or near the head end of the rivet and a cylindrical bore 28 extending entirely through the head and shank. Bore 28 includes a portion 30 and a reduced diameter bore portion 32 near the head end of the rivet 20. Bore portion 32 is provided with annular grooves 32A therein which define projections 32B therebetween. Bore 28 also includes another portion 21 of reduced diameter at or near the insertion end of rivet 20. Shank 24 also has a plurality (two) of elongated perforations 34 extending through the shank wall and defining a plurality of (two) flexible wall portions 36 which fold outwardly during expansion of rivet 20, as FIGS. 7 and 8 shows. Each flexible wall portion 36 includes a shoulder 37 along which it bends. The reduced diameter portion 21 in bore 28 is complementary to an indentation 52 in the shank 40 of the drive pin 22 and serves to hold the rivet 20 and pin 22 in temporary association. Furthermore, this widening of the shank wall at portion 21 also strengthens the wall and prevents outward bending of the shank wall under axial pressure when pin 22 is drawn thereagainst.

Drive pin 22, which has a head end and an insertion end, comprises a cylindrical pin shank 40 having a head or flange 42 near its head end, a first or intermediate portion 44, a break-away indentation 46 at one end of said intermediate portion to enable break-off of the superfluous projecting end of the pin shank by axial force and an adjoining smooth cylindrical tool-engageable protruding or second portion 48 near its insertion end. The intermediate portion 44 of shank 40 includes a plurality of peripheral gripping members or serrations 50 which take the form of axially spaced apart annular sharp-edged projections. Portion 44 of pin shank 40 also includes at its head end the aforementioned indentation 52. Portion 44 is frictionally and releasably engageable with the projection or reduced diameter bore portion 21 in rivet 20 to maintain rivet 20 and pin 22 in association with each other prior to use, as FIG. 6 shows. The diameter of portion 44 (and its serrations 50) of the bore portion 30 is smaller than the diameter in rivet 20 but is larger than bore portion 32. The gripping members 50 are engageable with the projections 32B in reduced diameter bore portion 32 after axial movement of the pin effects expansion of the rivet 20 to hold the pin and the rivet together permanently. The serrations 50 are the same diameter as pin shank 40 but the shank portion 48 is of slightly smaller diameter so as to fit snuggly in narrower bore portion 32. Bore portion 30 does not, however, engage the serrations 50. The break-away indentation 46 is located on the pin shank 40 in that portion which is above the gripping members or serrations designated 50.

Expansion rivet assembly 10 operates and is used as follows. Initially assume that rivet 20 and drive pin 22 are separated from each other, as is the case immediately after they are independently manufactured. For convenience and to prevent loss or misplacement of either component, the pin 22 is inserted, either manually or by machine assembly, in the bore 28 of rivet 20 to the position shown in FIG. 6 wherein portion 21 in bore 28 frictionally engages the indentation 52 in pin 22 and the pin head 42 bears against the insertion end surface 39 of rivet 20. In this pre-assembled condition, the assembly 10 is then inserted into the aligned holes 12, 14 in the adjacent workpieces 16, 18, respectively, as FIG. 6 shows, and wherein the underside of the rivet head 26 bears against a surface of workpiece 16. As FIG. 6 also shows, the tool-engageable portion 48 of pin shank 40 extends outwardly of the head end of the bore 28 of rivet 20 and expansion rivet assembly 10 is in readiness to be acted upon by a tool (not shown), which is conventional and used in the fastener trades to effect rivet expansion. Such tool comprises two relatively movable components (not shown), one of which forces rivet head 26 firmly against workpiece 16, while the other of which simultaneously grips portion 48 of pin 22 and pulls it axially (and upwardly relative to FIG. 6) in bore 28 to rivet 20. Such pin movement causes pin head 42 to move against end 39 of rivet shank 24 thereby causing the flexible wall portions 36 to fold to the position shown in FIGS. 7 and 8, whereby the workpieces 16, 18 are trapped between rivet head 26 and the folded wall portions 36. As pin 22 moves axially from the position shown in FIG. 6 to that shown in FIG. 7, the pin shank 40 moves outwardly of rivet bore 28, the serrations 50 move into tight engagement with the wall of reduced diameter bore portion 32, and the break-away indentation 46 moves even with the top surface of rivet head 26. In this condition, the pin 22 is no longer movable axially in either direction in bore 28 of rivet 20. Further axial pulling on pin 22 by the tool (not shown) results in pin portion 48 separating from pin portion 44 in the region of the break-away indentation 46, as FIG. 7 shows. Since rivet 20 and pin 22 are now held together under relatively high force, and since the plastic of which the rivet and pin are made is somewhat "flowable" over a period of time (one or two days) when under pressure, two things occur: first, the wall of narrow bore portion 32 flows between the pin serrations 50 making component separation impossible without rivet assembly destruction; and, second, portion 21 of the end 39 of rivet shank 24 of rivet 20 flows into the recess 52 beneath pin head 42 of pin 22 thereby resulting in even additional tight engagement between the rivet and pin.

Second Embodiment

Figure 12:
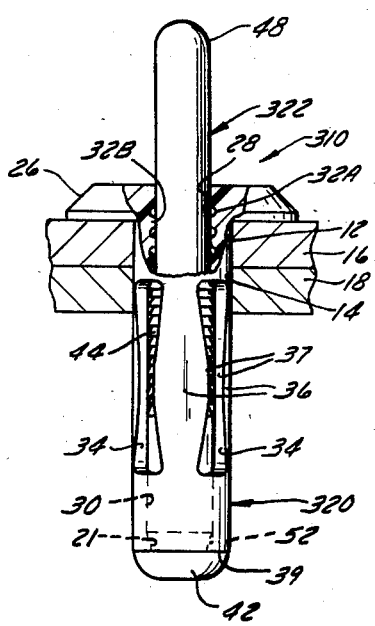
FIG. 12 is a side elevation view, partly in section, of an expansion rivet assembly in accordance with the second embodiment of the invention, and showing it associated with workpieces to be joined but prior to expansion of the rivet.
Figure 13:
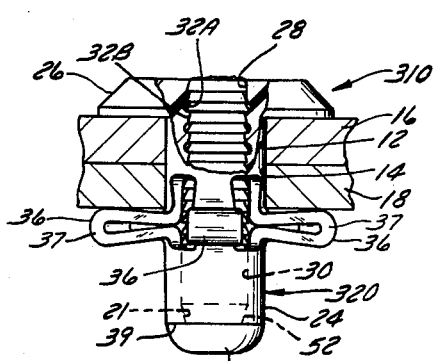
FIG. 13 is a view similar to FIG. 12 but showing the assembly after expansion of the rivet and break-off of the pin.
Figure 14:
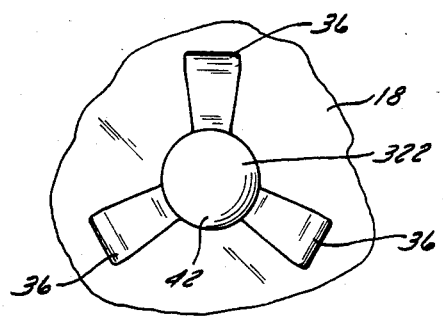
FIG. 14 is a bottom plan view of the assembly of FIG. 13.

Referring to FIGS. 9 through 14, the numeral 310 designates an expansion rivet assembly in accordance with a second embodiment of the invention which is insertable through aligned holes 12, 14 in a plurality of (two) workpieces 16, 18, respectively, (see FIGS. 12, 13, 14) to secure the workpieces together firmly and permanently. FIG. 12 shows assembly 310 in the holes 12, 14 but not yet expanded, whereas FIGS. 13 and 14 show the assembly fully installed. Rivet assembly 310 comprises an expandable hollow plastic rivet 320 and an associated plastic drive pin 322 which is movable by a tool (not shown) axially relative to the rivet to effect expansion of the latter, as comparison of FIGS. 12 and 13 shows. Rivet 320 and pin 322 are made of plastic such as Nylon (TM) or the like and are formed separately by injection molding processes. Rivet 320 comprises shank 24 having a head 26 near one end and a bore 28 extending through the head and shank. Bore 28 includes a wider portion 30 and a reduced diameter bore portion 32 near the end of the shank 24 nearest head 26. Bore portion 32 is provided with annular grooves 32A therein which define projections 32B therebetween. Shank 24 also has a plurality of (three) elongated perforations 34 extending through the shank wall and defining a plurality of (three) flexible wall portions 36 which fold outwardly during expansion of rivet 320, as FIGS. 13 and 14 show. Each flexible wall portion 36 includes a shoulder 37 along which it bends.

Drive pin 322 is identical to pin 22 hereinbefore described. The intermediate portion 44 of shank 40 includes a plurality of peripheral gripping members or serrations 50 which take the form of axially spaced apart annular sharp-edged projections. The groove 52 in the pin 322 is releasably engageable with reduced diameter bore portion 21 in the rivet 320 to maintain rivet 320 and pin 322 in association with each other prior to use, as FIG. 12 shows. The gripping members 50 are engageable with the projections 32B in reduced diameter bore portion 32 after axial movement of the pin effects expansion of the rivet 320 to hold the pin and the rivet together permanently. The serrations 50 are the same diameter as pin shank 40 but the shank portion 48 is narrower and fits slidingly in narrower bore portion 32.

We claim:
1. A two-piece expansion rivet assembly (10) for permanent installation in a hole (12,14) which extends between an outer surface and an inner surface of a workpiece, said workpiece comprising one or more components (16,18), said expansion rivet assembly (10) comprising:
  I. a hollow expandable plastic rivet (20) comprising:
    (A) an elongated rivet shank (24) of predetermined outside diameter and having a head end and an insertion end (39), insertable through said hole (12,14) from said outer surface,
    (B) and an external flange (26) near said head end for engaging said outer surface of said workpiece when said rivet shank (24) is fully inserted through said hole (12,14);
      (1) said rivet shank (24) having an axial bore (28) therethrough which includes
        (a) an intermediate portion (30) of predetermined inside diameter,
        (b) a first portion (32) of first reduced diameter smaller than said predetermined inside diameter and located near said head end having at least one annular groove (32A) defining a flexible shoulder (32B);
        (c) a second flexible portion (21) of second reduced diameter smaller than said predetermined inside diameter but larger than said first reduced diameter and located near said insertion end,
      (2) said rivet shank (24) having a plurality of perforations (34) through the sides thereof communicating with said axial bore (28) and defining flexible rivet shank walls (36);
  II. and a plastic drive pin (22) for association with said rivet (20) and movable thereon from an initial position to an installed position whereby said rivet shank walls (36) flex outwardly to engage said inner surface of said workpiece and comprising:
    (A) an elongated pin shank (40) having a flange end and an insertion end,
    (B) and an external flange (42) near said flange end of said pin shank (40) for engaging said insertion end (39) of said rivet shank (24) when said drive pin (22) is inserted from said insertion end of said rivet (24) into said initial position and having an outside diameter which is not greater than said predetermined outside diameter of said rivet shank (24);
      (1) said pin shank (40) having an intermediate portion (44) near said flange end thereof which is of slightly larger diameter than that of said second flexible portion (21) of said axial bore (28), which is of larger diameter than that of said first portion (32) of said axial bore (28)

and is of smaller diameter than intermediate bore portion (30),
    (a) said intermediate portion (44) having at least one serration (50) for permanently engaging said flexible shoulder (32B) when said pin shank (40) is in installed position
    (b) said intermediate portion (44) having at least one annular groove (52) for releasably engaging said second flexible portion (21) of reduced diameter when said pin shank (40) is inserted in said axial bore (28) in said initial position so as to maintain said drive pin (22) releasably associated with said rivet (20),
    (2) said pin shank (40) having a tool-engageable break-away portion (48) which is of smaller diameter than that of said first portion (32) and which extends through and outwardly of said first portion (32) of said axial bore (28) when said drive pin (22) is in said initial position,
    (3) said pin shank (40) having a break-away indentation (46) between said intermediate portion (44) and said break-away portion (48) thereof whereby said break-away portion (48) is detachable from said intermediate portion (44) when axial tensile force is applied to said breakaway portion (48) by a tool.

2. A two-piece expansion rivet assembly (10) for permanent installation in a hole (12,14) which extends between an outer surface and an inner surface of a workpiece, said workpiece comprising one or more components (16,18), said expansion rivet assembly (10) comprising:
  I. a hollow expandable plastic rivet (20) comprising:
    (A) an elongated rivet shank (24) of predetermined outside diameter and having a head end and an insertion end (39),
      (1) said rivet shank (24) having an axial bore (28) therethrough which extends between said ends,
        (a) said axial bore (28) having an intermediate portion (30) of predetermined inside diameter,
        (b) said axial bore (28) having a first portion (32) of first reduced diameter smaller than said predetermined inside diameter and located near said head end of said rivet shank (24),
        (i) said first portion (32) being provided with at least one annular groove (32A) defining a flexible shoulder (32B),
        (c) said axial bore (28) having a second flexible portion (21) of second reduced diameter smaller than said predetermined inside diameter but larger than said first reduced diameter and located near said insertion end of said rivet shank (24),
      (2) said rivet shank (24) having a plurality of perforations (34) through the sides thereof communicating with said intermediate portion (30) of said axial bore (28) and defining flexible rivet shank walls (36) which flex outwardly when said insertion end of said shank is moved axially toward said head end of said rivet shank (24);
    (B) and an external flange (26) near said head end of said rivet shank (24) for engaging said outer surface of said workpiece when said rivet shank (24) is fully inserted through said hole (12,14) from said outer surface;
  II. and a plastic drive pin (22) for association with said rivet (20) and movable from an initial position to an installed position thereon and comprising:
    (A) an elongated pin shank (40) having a flange end and an insertion end,
      (1) said pin shank (40) having an intermediate portion (44) near said flange end thereof which is of smaller diameter than that of said intermediate portion (30) of said axial bore (28) of said rivet (24) and which is of larger diameter than that of said first portion (32) of said axial bore (28) of said rivet (24),
        (a) said intermediate portion (44) at the end thereof nearest said insertion end of said pin shank (40) being provided with at least one serration (50) for permanently engaging said flexible shoulder (32B) in said first portion (32) of said axial bore (28) of said rivet (20) when said pin shank (40) is fully inserted in said axial bore (28) and said rivet shank (24) is fully expanded,
        (b) said intermediate portion (44) at the end thereof nearest said flange end of said pin shank (40) being provided with at least one annular groove (52) for releasably engaging said second flexible portion (21) of reduced diameter of said axial bore (28) of said rivet shank (24) when said pin shank (40) is fully inserted in said axial bore (28) but before said rivet shank (24) is fully expanded so as to maintain said drive pin (22) releasably associated with said rivet (20) in said initial position,
      (2) said pin shank (40) having a tool-engageable break-away portion (48) near said insertion end thereof which is of smaller diameter than that of said first portion (32) of said axial bore (28) of said rivet (24) and which extends through and outwardly of said first portion (32) of said axial bore (28) of said rivet shank (24) when said pin shank (40) is fully inserted in said axial bore (28) and said drive pin (22) is in said initial position,
      (3) said pin shank (40) having a break-away indentation (46) between said intermediate portion (44) and said break-away portion (48) thereof whereby said break-away portion (48) is detachable from said intermediate portion (44) when axial tensile force is applied to said breakaway portion (48) by a tool,
    (B) and an external flange (42) near said flange end of said pin shank (40) for engaging said insertion end (39) of said rivet shank (24) when said pin shank (40) is fully inserted in said axial bore (28) of said rivet (20) from said insertion end of said rivet shank (24) into said initial position so as to enable further axial movement of said drive pin (22) by said tool to effect outward expansion of said rivet shank walls (36) and to effect engagement of said serration (50) on said drive pin (22) with said shoulder (32B) in said axial bore (28) of said rivet (20),
      (1) said external flange (42) having an outside diameter which is not greater than said predetermined outside diameter of said rivet shank (24).

* * * * *